3,448,135
PROCESS FOR THE PREPARATION OF β-CYANO-ETHYLTRICHLOROSILANE EMPLOYING PYRAZOLONE CATALYSTS
Paul Alfred Eugene Guinet and Robert Raphael Puthet, Lyon, France, assignors to Rhone-Poulenc S.A., Paris, France, a French body corporate
No Drawing. Filed Dec. 5, 1966, Ser. No. 598,932
Claims priority, application France, Dec. 9, 1965, 41,618
Int. Cl. C07f 7/16
U.S. Cl. 260—448.2   7 Claims This invention relates to the preparation of β-cyanoethyltrichlorosilane by reaction of trichlorosilane with acrylonitrile.

It is known that β-cyanoethyltrichlorosilane may be prepared by reaction of trichlorosilane with acrylonitrile in the presence of a catalyst. Numerous catalysts and catalytic systems have already been suggested for this reaction, amongst which may be mentioned tertiary amines, N,N-disubstituted amides, triorganophosphines, triorganoarisines, triorganostibines, silicon-containing amines, phosphonates and mixtures of cuprous oxide or halide/diamine/trialkylamine.

However these catalysts are not entirely satisfactory. While they sometimes allow the reaction to be carried out at atmospheric pressure and at slightly raised temperatures, under these conditions the reaction times are long and the yields mediocre.

If the catalysts mentioned above are used under pressures above atmospheric pressure, the trichlorosilane reacts rather rapidly with the acrylonitrile and the yields achieved, whilst rather variable, are about 65%. Unfortunately, however, these catalysts favour the formation of tarry byproducts and of numerous unstable complexes, the presence of which makes the purification of the β-cyanoethyltrichlorosilane by known purification methods, especially by distillation, very difficult, and constitutes an obstacle to the preparation of β-cyanoethyltrichlorosilane in a satisfactory degree of purity for subsequent requirements. Very often the reaction mixture containing the β-cyanoethyltrichlorosilane has to be filtered, stripped of volatile materials and freed of tar. The β-cyanoethyltrichlorosilane has then to be distilled several times before it can be used as a monomer or comonomer in the preparation of organosilicon polymers such as resins, oils, greases, pastes and gels.

β-Cyanoethyltrichlorosilane has a variety of uses. For example when treated with ethanol, it is converted into β-cyanoethyltriethoxysilane which by hydrogenation of the CN group in the presence of a hydrogenation catalyst may be converted into γ-aminopropyltriethoxysilane, this being a reagent used in treating glass fibres in the manufacture of laminates. All these chemical conversions are delicate and it is extremely advantageous to be able to use as pure a β-cyanoethyltrichlorosilane starting material as possible, as this simplifies obtaining the final products in the desired high degree of purity.

It has become necessary to have a starting material of well-defined purity even for the manufacture of resins and organosilicon compounds containing the unit CNCH₂CH₂SiO₃/₂ since very small traces of impurities can profoundly change the structure, storage stability and setting time of organosilicon resins.

It has now been found that the manufacture of β-cyanoethyltrichlorosilane by the reaction of trichlorosilane with acrylonitrile is significantly improved if a pyrazolone, such as antipyrine or pyramidone, is used as catalyst. The persent invention accordingly provides a process for the manufacture of β-cyanoethyltrichlorosilane which comprises contacting trichlorosilane with acrylonitrile at elevated temperature in the presence of, as catalyst, a pyrazolone.

The amount of catalyst may vary between rather wide limits, for example 0.5 to 8% by weight based on the total weight of trichlorosilane employed. An amount of 1.5 to 4% is generally very suitable.

Especially suitable pyrazolones are those which may be represented by the general formula:

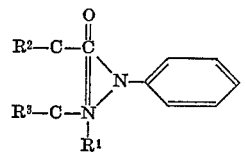

where $R^1$ is alkyl of 1 to 4 carbon atoms, $R^2$ is hydrogen or dialkylamino in which each alkyl is of 1 to 4 carbon atoms, and $R^3$ is hydrogen or alkyl of 1 to 4 carbon atoms.

The reaction is carried out by heating the mixture of products, preferably in an autoclave under a nitrogen atmosphere. The temperature range within which it is appropriate to work is rather wide; but the best results are in practice obtained at temperatures within the range 110–170° C., the optimum temperature depending on the other reaction conditions. The nitrogen which forms the atmosphere in the autoclave after sweeping out the air may be introduced at various pressures, for example 1 to 10 bars at 20° C.

The new process may be carried out in various ways. For example, the whole of the acrylonitrile used, and the catalyst, may be introduced into the autoclave, the air then displaced with nitrogen and the desired nitrogen pressure set up. The mixture is heated to about 120° C., after which heating is stopped and the trichlorosilane is injected by means of a metering pump with constant cooling, the speed of this injection and the cooling being so controlled that the temperature does not rise excessively and remains, for example, at between 140 and 150° C. When the injection of trichlorosilane is complete, the apparatus is cooled and vented, and all volatile products, that is to say practically all products distilling at up to about 95° C., are removed by distillation under atmospheric pressure. The β-cyanoethyltrichlorosilane is then obtained from the residue by distillation under reduced pressure in a distillation apparatus fitted with an efficient fractionating column. In this way, and without any other treatment, a pure product is obtained which crystallises when left at ambient temperature and which, when stored in a glass flask, does not discolour even on prolonged storage. Analysis of the product by the usual analytical methods, such as gas phase chromatography, infra-red spectrophotometry and nuclear magnetic resonance, shows that the product obtained consists exclusively of β-cyanoethyltrichlorosilane.

Silicon tetrachloride, acrylonitrile, and traces of trichlorosilane and other substances of undetermined character are isolated in the volatile products which distil at atmospheric pressure. The silicon tetrachloride and acrylonitrile form an azeotrope whose boiling point and composition are described in French patent specification No. 955,351.

The mode of introduction of the reagents into the reactor is not critical. Instead of injecting the trichlorosilane into the whole of the acrylonitrile heated to 120° C. as described above, various other varients may be followed. For example, a mixture of trichlorosilane and acrylonitrile may be introduced under pressure into the reactor which only contains the catalyst and part of the acrylonitrile. Furthermore the acrylonitrile introduced into the autoclave may be diluted with silicon tetrachloride. Silicon tetrachloride may also be used as a diluent for the trichlorosilane or for the acrylonitrile-trichlorosilane mixture injected into the autoclave. However it must be understood that once the trichlorosilane is introduced into the reactor it must be in the presence of at least a stoichiometric proportion of acrylonitrile.

An apparatus which allows the process of the invention to be operated continuously is easily produced. One embodiment for example consists of using a closed chamber provided with an overflow system linked to a trap device which continuously feeds a distillation column. Small diameter tubes combined into bundles may also be used as reactors.

The yields achieved by the new process are high, and exceed 70% when working discontinuously. When working continuously it is possible to obtain even higher yields.

The following examples, in which the pressures are gauge pressures, illustrate the invention.

EXAMPLE 1

530 g. of acrylonitrile (10 mols) and 38 g. of antipyrine (1,5-dimethyl-2-phenyl-3-pyrazolone) are introduced into a 3.6 l. autoclave fitted with a blade stirrer rotating at 200 r.p.m. After purging with nitrogen, and establishing a nitrogen pressure of about 2 bars, the nitrogen inlet is closed and the autoclave is heated to 120° C. At this point the pressure in the autoclave reaches 8 bars. External heating is then stopped and 1000 cm.³ of trichlorosilane (about 1355 g.) are injected by means of a metering pump over the course of 25 minutes, corresponding to a flow rate of 2.4 l./hour. During the introduction of the chlorosilane, the temperature rises from 120° C. to 170° C. and the pressure from 8 to 20 bars. Stirring is continued for 10 minutes after the end of the introduction of the chlorosilane. At the end of these 10 minutes the temperature of the reaction mixture is about 148° C., and the pressure inside the autoclave about 18 bars. The apparatus is then cooled, vented and purged with a stream of nitrogen. 1900 g. of liquid are obtained. On distilling at atmospheric pressure, 202 g. of volatile products boiling between 35° and 78° C. are first isolated, and the remaining 1688 g. of liquid are then rectified under reduced pressure (18–20 mm. of mercury). In this way 1370 g. of a product are collected, B.P. 102–108° C./18–20 mm. Hg, $n_D^{20}=1.4615$, $d_4^{20}=1.356$, and percent of hydrolysable chlorine=56.1%.

This compound crystallises on being left at ambient temperature, giving crystals melting at 34–35° C. It is β-cyanoethyltrichlorosilane, the structure being verified by infra-red spectrophotometry and nuclear magnetic resonance. The yield is 72.6% based on the trichlorosilane employed. A polymerised residue weighing 244 g. remains in the distillation vessel, whilst 74 g. of low boiling products are recovered in the trap placed between the vacuum pump and the collecting vessel containing the β-cyanoethyltrichlorosilane.

Chromatographic analysis of the volatile products distilled at atmospheric pressure and those recovered from the trap shows the presence of silicon tetrachloride, acrylonitrile, traces of trichlorosilane and other products of undetermined character.

EXAMPLE 2

212 g. of acrylonitrile (4 mols) and 38 g. of antipyrine are introduced into the apparatus described in Example 1. The atmosphere of the autoclave is displaced by a stream of nitrogen and a nitrogen pressure of 2 bars is established. The nitrogen inlet is then closed, and the autoclave heated to 120° C., at which temperature the pressure reaches 8 bars. Heating is stopped and an equimolecular mixture of 10 mols of trichlorosilane (1355 g.) and 10 mols of acrylonitrile (530 g.) is injected by means of a metering pump. During this injection, which lasts 25 minutes and corresponds to a flow rate of 4 l./hour, the temperature is kept at between 140° and 150° C. by external cooling, and the pressure rises from 8 to 20 bars. When the introduction of the trichlorosilane is complete, the mixture is stirred for a few minutes more, and the apparatus is then cooled. 2044 g. of liquid, corresponding to 96% of the charge, are withdrawn from the autoclave, and first distilled at atmospheric pressure, thereby removing 317 g. of product boiling between 52° and 97° C. The 1727 g. of remaining product are then rectified under reduced pressure, and 1375 g. of β-cyanoethyltrichlorosilane are thus isolated, B.P. 93° C./15 mm. Hg, $d_4^{20}=1.3615$, $n_D^{20}=1.4620$, and percent of hydrolysable chlorine=55.8%

The yield is 72.8% based on the trichlorosilane employed.

EXAMPLE 3

212 g. of acrylonitrile (4 mols) and 38 g. of antipyrine are charged into the apparatus described in Example 1. The autoclave is then purged with nitrogen and a nitrogen pressure of 1 bar is established. The autoclave is heated to 120° C., and the pressure rises to 7 bars. Heating is then stopped and a mixture of acrylonitrile (530 g., 10 mols), trichlorosilane (1355 g., 10 mols), and silicon tetrachloride (170 g., 1 mol) is injected over the course of 26 minutes. During this injection, the temperature is kept at between 130° and 140° C. by external cooling, and the pressure rises from 7 to 20 bars. After cooling the apparatus and removing gaseous products, 2264 g. of liquid are withdrawn and distilled at atmospheric pressure, giving 563 g. of volatile products boiling between 40° and 87° C. The 1693 g. of residual liquid is then rectified under reduced pressure to give 1431 g. of β-cyanoethyltrichlorosilane, B.P. 89–90° C./12 mm. Hg, $n_D^{20}=1.461$. $d_4^{20}=1.362$, and percent of hydrolysable chlorine=56.25%

The yield is 76% based on the trichlorosilane employed.

EXAMPLE 4

636 g. of acrylonitrile (12 mols) and 38 g. of antipyrine are introduced into a 3.6 l. autoclave which is purged with nitrogen. A nitrogen pressure of 5 bars is established in the autoclave which is then heated. Once the temperature in the mixture has reached 120° C., the pressure then being 10 bars, a mixture of 1355 g. of trichlorosilane (10 mols) and 170 g. of SiCl₄ (1 mol) is injected into the autoclave. During this injection, which takes 17 minutes corresponding to a flow rate of approximately 4 l./hour, the temperature is kept at about 140°–150° C., and the pressure rises from 10 to 24 bars. At the end of the reaction 2143 g. of liquid product are obtained, 379 g. of which boil between 57 and 80° C. and may be eliminated by distillation under atmospheric pressure.

The remaining 1760 g. are rectified under reduced pressure, and in this way 1411 g. of β-cyanoethyltrichlorosilane are obtained, B.P. 106° C./26 mm. Hg, $d_4^{20}=1.360$, $n_D^{20}=1.4615$, and percent of hydrolysable chlorine=56%. The yield is 74.8% based on the trichlorosilane employed.

EXAMPLE 5

636 g. of acrylonitrile (12 mols) and 38 g. of pyramidone (1,5 - dimethyl-2-phenyl-4-dimethylamine-3-pyrazolone) are introduced into the apparatus described in Example 4. The atmosphere in the apparatus is purged with nitrogen, and a nitrogen pressure of 7 bars is established. The apparatus is then heated until the mixture is at 120° C., and a mixture consisting of 1355 g. (10 mols) of trichlorosilane and 170 g. of silicon tetrachloride (1 mol) is injected over the course of 15 minutes, corresponding to a mean flow rate of 4.520 l./hour. Whilst these reagents are being introduced, the temperature is kept at between 140° and 150° C. in the reaction mixture by external cooling and the pressure rises from 13 to 25 bars. At the end of the reaction 2156 g. of liquid product, about 98% of the charge, are withdrawn. After distillation at atmospheric pressure to remove 444 g. of product boiling between 48° and 80° C., 1710 g. of a liquid product are obtained which on rectification in vacuo yields 1363 g. of β-cyanoethyltrichlorosilane, B.P. 87–90° C./10–11 mm. Hg, $d_4^{20}$=1.359, $n_D^{20}$=1.4618, and percent of hydrolysable chlorine=55.4 %. The yield is 72.4% based on the trichlorosilane employed.

EXAMPLE 6

636 g. of acrylonitrile (12 mols) and 38 g. of pyramidone are introduced into an autoclave equipped as described in Example 1. The autoclave is purged with nitrogen, and a nitrogen pressure of 7 bars is established. The mixture is then heated to 120° C. as in the preceding examples, and the pressure reaches 13 bars. Heating is stopped and a mixture of 1355 g. of trichlorosilane (10 mols) and 255 g. of silicon tetrachloride (1.5 mols) is injected over the course of 16 minutes, corresponding to a flow rate of 4.45 l./hour. During this injection, the temperature is kept at between 140° and 150° C. by gentle external cooling, and the pressure rises from 13 to 28 bars. After cooling to ambient temperature and releasing the pressure, 2245 g. of liquid product are withdrawn, representing 98.1% by weight of the materials introduced. On distillation at atmospheric pressure, 558 g. of product boiling between 44° and 78° C. are removed. The remaining 1686 g. of liquid are rectified under reduced pressure, and 1392 g. of β-cyanoethyltrichlorosilane are thus collected, B.P. 86–90° C./12–13 mm. Hg, $d_4^{20}$=1.361, $n_D^{20}$=1.4613, and percent of hydrolysable chlorine equal 55.5%. The yield is 73.8% based on the trichlorosilane employed.

EXAMPLE 7

212 g. of acrylonitrile (4 mols) and 57 g. of pyramidone are introduced into the apparatus described in Example 7, which is purged with nitrogen and a nitrogen pressure of 3 bars is established. The mixture is heated to 120° C. and the pressure rises to 9 bars. A mixture of 530 g. of acrylonitrile (10 mols), 1355 g. of trichlorosilane (10 mols), and 170 g. of silicon tetrachloride (1 mol) is injected at a flow rate of 2.4 l./hour. During this introduction, which takes 45 minutes, the temperature is kept at between 120° and 130° C. and the pressure rises from 9 to 16 bars. After cooling to ambient temperature and releasing the pressure, 2250 g. of liquid product (about 97.6% by weight of the materials introduced) are withdrawn. 548 g. of product boiling between 40° and 80° C. are removed by distillation at atmospheric pressure. The 1702 g. of residual liquid are then rectified under reduced pressure and in this way 1432 g. of β-cyanoethyltrichlorosilane are obtained, B.P. 78–80° C./7–8 mm. Hg, $n_D^{20}$=1.4625, $d_4^{20}$=1.362, and percent of hydrolysable chlorine=56.4%. The yield is 76% based on the trichlorosilane employed.

We claim:

1. Process for the manufacture of β-cyanoethyltrichlorosilane which comprises contacting trichlorosilane with at least a stoichiometric preparation of acrylonitrile at elevated temperature in the presence of, as catalyst, a pyrazolone.

2. Process according to claim 1 in which the reaction is carried out in the presence of silicon tetrachloride as diluent.

3. Process according to claim 1 in which the catalyst is antipyrine or pyramidone.

4. Process according to claim 1 in which the amount of catalyst used is 0.5 to 8% of the weight of the trichlorosilane.

5. Process according to claim 4 in which the amount of catalyst is 1.5 to 4% of the weight of the trichlorosilane.

6. Process according to claim 1 in which the reaction is carried out at 110° to 170° C. in a nitrogen atmosphere under superatmospheric pressure.

7. Process according to claim 1 in which the trichlorosilane alone or in admixture with part of the acrylonitrile is injected into a heated mass of at least part of the acrylonitrile, the total molar amount of trichlorosilane being not more than the total molar amount of acrylonitrile, and the trichlorosilane never being in excess in the heated mass.

References Cited

UNITED STATES PATENTS

| 2,971,971 | 2/1961 | Bluestein. |
| 2,971,972 | 2/1961 | Bluestein. |
| 3,018,300 | 1/1962 | Pike. |
| 3,020,301 | 2/1962 | Pike. |
| 3,257,440 | 6/1966 | Jex. |

TOBIAS E. LEVOW, *Primary Examiner.*

P. F. SHAVER, *Assistant Examiner.*